US012587857B2

(12) United States Patent
Mallya et al.

(10) Patent No.: US 12,587,857 B2
(45) Date of Patent: Mar. 24, 2026

(54) SIGNAL SPOOF DETECTION AT BASE STATIONS

(71) Applicant: Verizon Patent and Licensing Inc., Basking Ridge, NJ (US)

(72) Inventors: Sumanth S. Mallya, Flower Mound, TX (US); Jerry Gamble, Jr., Grapevine, TX (US)

(73) Assignee: Verizon Patent & Licensing Inc., Basking Ridge, NJ (US)

( * ) Notice: Subject to any disclaimer, the term of this patent is extended or adjusted under 35 U.S.C. 154(b) by 1087 days.

(21) Appl. No.: 17/366,717

(22) Filed: Jul. 2, 2021

(65) Prior Publication Data

US 2023/0007488 A1 Jan. 5, 2023

(51) Int. Cl.
| *H04L 29/06* | (2006.01) |
| *G06N 3/08* | (2023.01) |
| *G08B 21/18* | (2006.01) |
| *H04L 9/40* | (2022.01) |
| *H04W 12/122* | (2021.01) |
| *H04W 88/08* | (2009.01) |
| *G01S 19/21* | (2010.01) |

(52) U.S. Cl.
CPC ............ *H04W 12/122* (2021.01); *G06N 3/08* (2013.01); *G08B 21/182* (2013.01); *H04L 63/1466* (2013.01); *H04W 88/08* (2013.01); *G01S 19/215* (2013.01)

(58) Field of Classification Search
CPC ...... H04W 12/122; H04W 88/08; G06N 3/08; H04L 63/1466
See application file for complete search history.

(56) References Cited

U.S. PATENT DOCUMENTS

| | | | | |
|---|---|---|---|---|
| 11,374,665 | B1 * | 6/2022 | Ryan .................... | H04B 17/391 |
| 2020/0241147 | A1 * | 7/2020 | Schwindt ............. | G01S 19/215 |
| 2020/0322805 | A1 * | 10/2020 | Wang .................... | H04W 88/10 |
| 2020/0371246 | A1 * | 11/2020 | Marmet ................ | G01S 5/0009 |
| 2021/0333410 | A1 * | 10/2021 | Gum ....................... | G01S 19/48 |

* cited by examiner

*Primary Examiner* — Wasika Nipa

(57) ABSTRACT

One or more computing devices, systems, and/or methods for detecting spoofing attacks are provided. Location information of a base station may be evaluated to determine a true position of the base station. Satellite signals received by the base station may be processed and evaluated to calculate a real time position of the base station. A distance between the real time position and the true position may be calculated. In response to the distance exceeding a threshold distance, an alert is generated to indicate that the base station is experiencing a spoofing attack.

20 Claims, 10 Drawing Sheets

Figure 1:
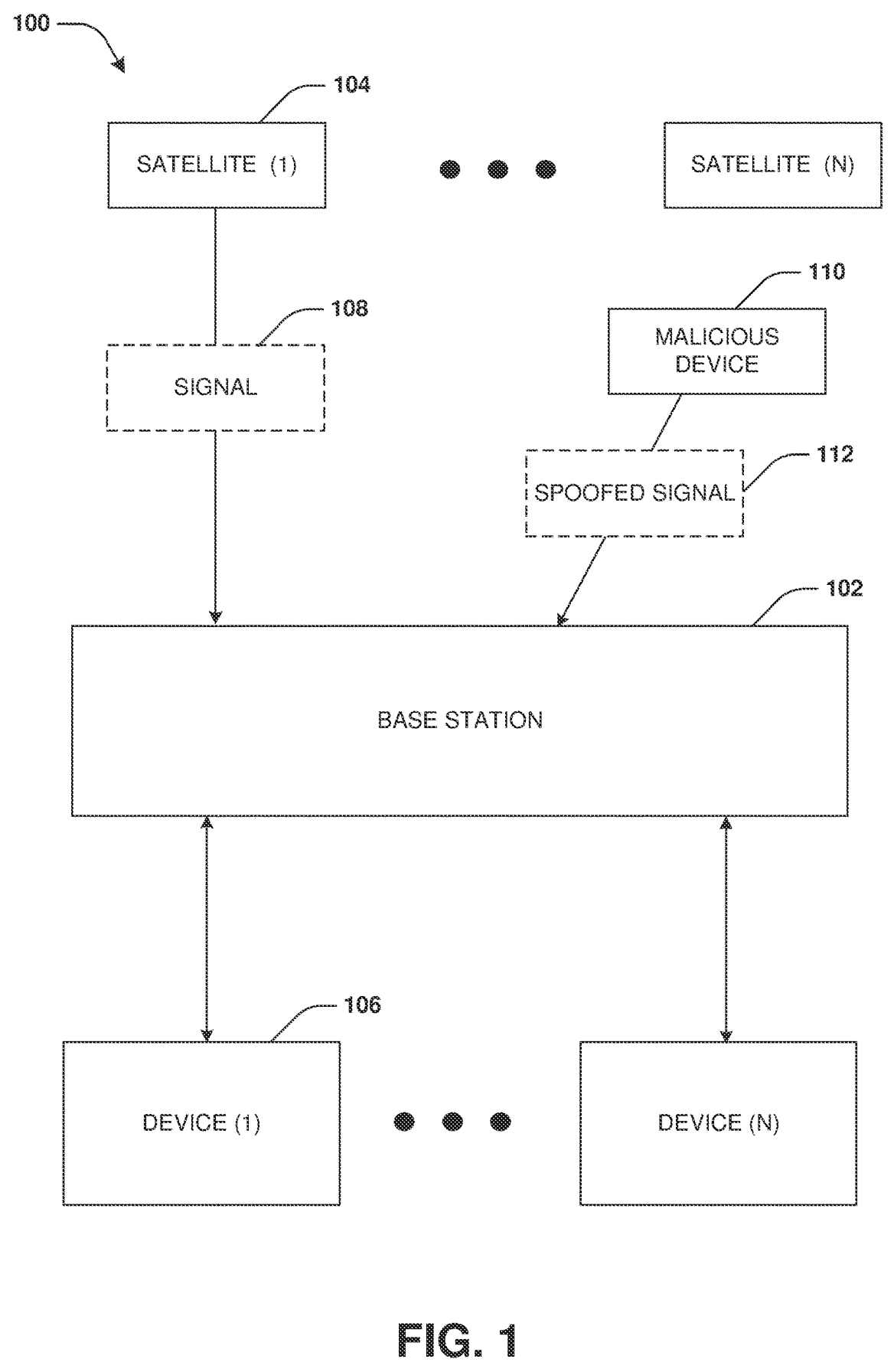

100

104

SATELLITE (1)　● ● ●　SATELLITE (N)

108

SIGNAL

110

MALICIOUS DEVICE

112

SPOOFED SIGNAL

102

BASE STATION

106

DEVICE (1)　● ● ●　DEVICE (N)

EVALUATE LOCATION INFORMATION OF BASE STATION TO
DETERMINE TRUE POSITION OF BASE STATION     202

EVALUATE SIGNALS TO CALCULATE REAL TIME POSITION OF
BASE STATION     204

CALCULATE DISTANCE BETWEEN REAL TIME POSITION AND TRUE
POSITION     206

IN RESPONSE TO DISTANCE EXCEEDING THRESHOLD, GENERATE
ALERT     208

Figure 3:
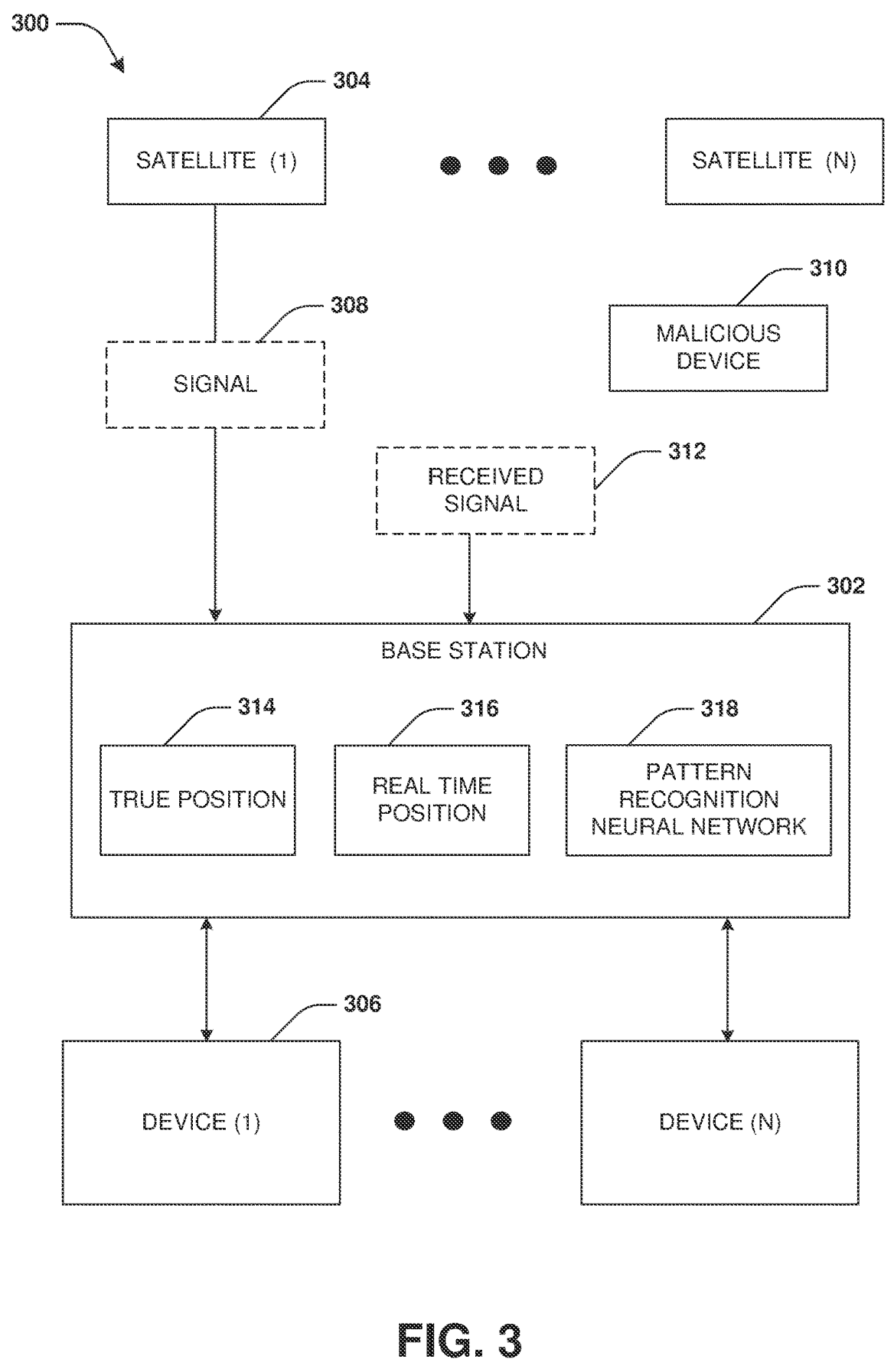

300

304

SATELLITE (1)     ● ● ●     SATELLITE (N)

310

MALICIOUS DEVICE

308

SIGNAL

312

RECEIVED SIGNAL

302

BASE STATION

314

TRUE POSITION

316

REAL TIME POSITION

318

PATTERN RECOGNITION NEURAL NETWORK

306

DEVICE (1)     ● ● ●     DEVICE (N)

SELECT MEASUREMENT POINT ALONG SATELLITE ORBIT OF SATELLITE — 402

GENERATE POWER SPECTRAL DENSITY DATA DERIVED FROM SIGNAL POWER MEASUREMENTS — 404

COMPARE POWER SPECTRAL DENSITY DATA OF RECEIVED SIGNAL TO POWER SPECTRAL DENSITY DATA TO DETERMINE WHETHER RECEIVED SIGNAL HAS EXPECTED POWER — 406

Figure 5:
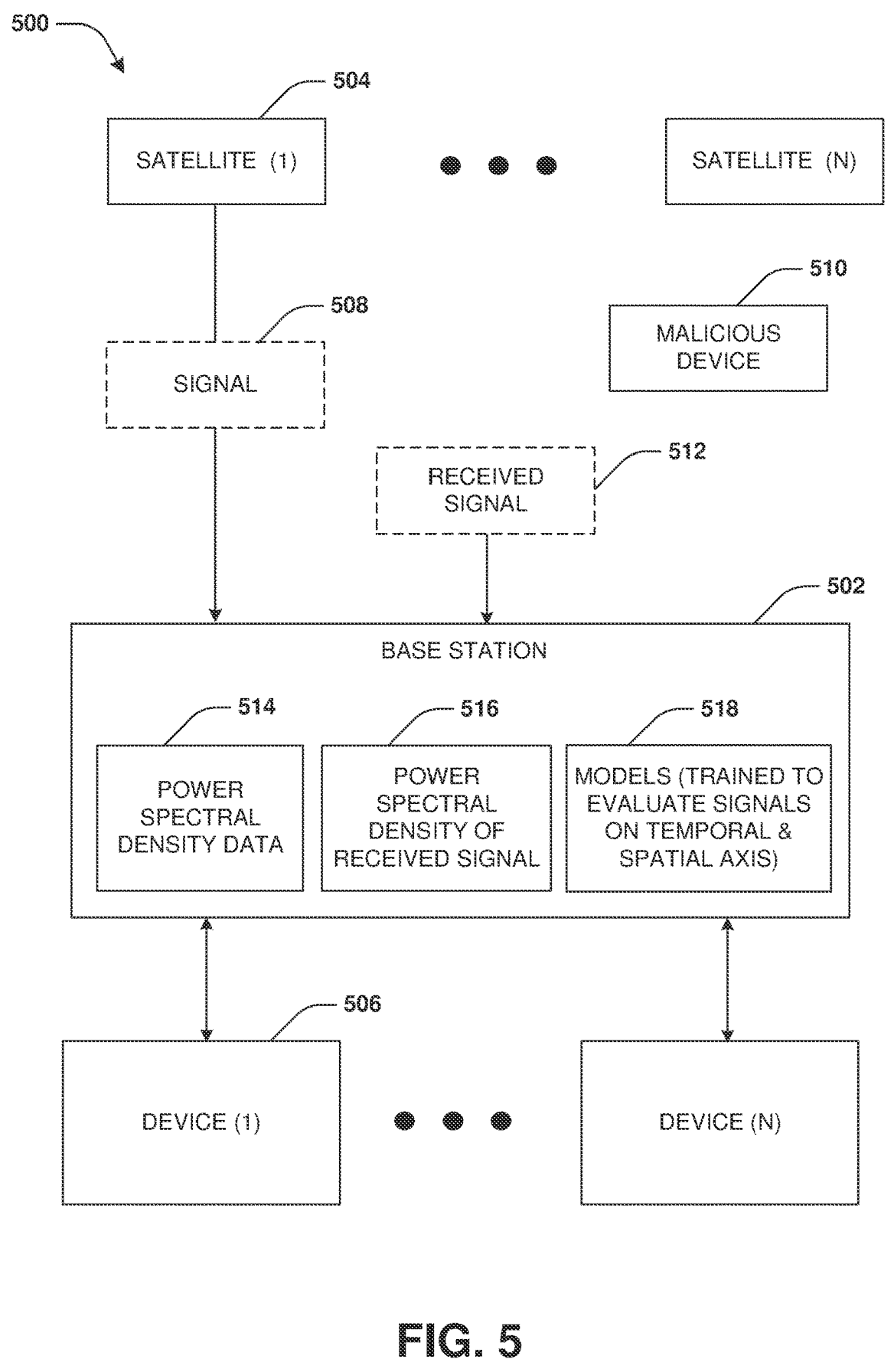

500

504

SATELLITE (1) ● ● ● SATELLITE (N)

510

MALICIOUS DEVICE

508

SIGNAL

512

RECEIVED SIGNAL

502

BASE STATION

514

POWER SPECTRAL DENSITY DATA

516

POWER SPECTRAL DENSITY OF RECEIVED SIGNAL

518

MODELS (TRAINED TO EVALUATE SIGNALS ON TEMPORAL & SPATIAL AXIS)

506

DEVICE (1) ● ● ● DEVICE (N)

Figure 7:
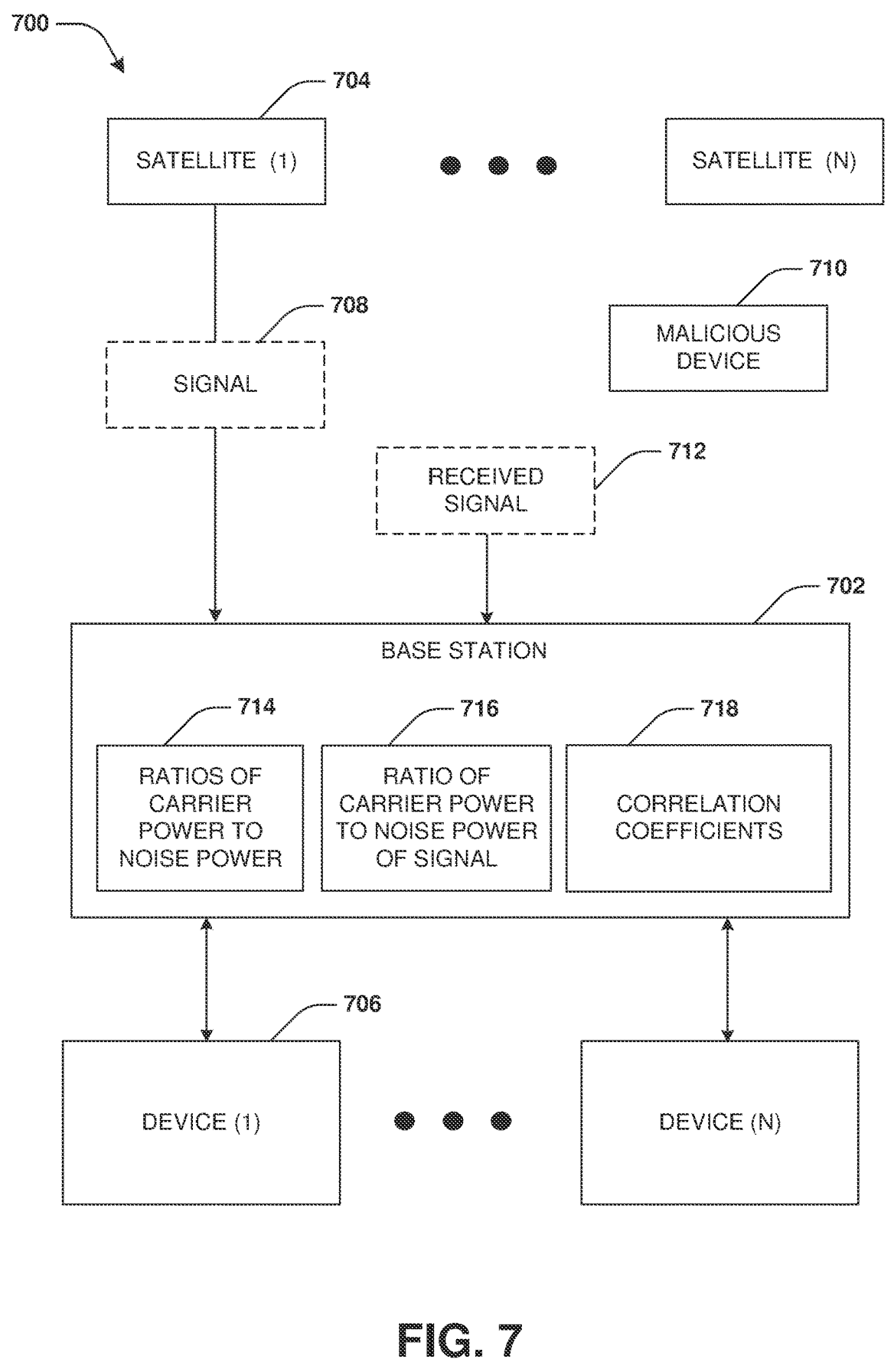

SATELLITE (1)

● ● ●

SATELLITE (N)

710

MALICIOUS
DEVICE

708

SIGNAL

712

RECEIVED
SIGNAL

702

BASE STATION

714

RATIOS OF
CARRIER
POWER TO
NOISE POWER

716

RATIO OF
CARRIER POWER
TO NOISE POWER
OF SIGNAL

718

CORRELATION
COEFFICIENTS

706

DEVICE (1)

● ● ●

DEVICE (N)

NON-TRANSITORY MEMORY DEVICE

804

001101 0110001 011000 0111111 0111111 0000000
00000 0111011 011110 011001 0111011 0000000

806

READING

808

DEVICE

812

PROCESSOR-
EXECUTABLE
INSTRUCTIONS

810

READER

816

PROCESSOR

EMBODIMENT

SIGNAL SPOOF DETECTION AT BASE STATIONS

BACKGROUND

A communication network may comprise a variety of network components that enable communication devices, such as user equipment, to communicate over the communication network. For example, the communication network may comprise base stations (e.g., a gNodeB base station, an eNodeB base station, etc.), baseband units, core network components, antennas, repeaters, switches, radio access network (RAN) controllers, etc. These communication devices, such as a base station, may experience a spoofing attack where a malicious entity may attempt to spoof signals transmitted to the base station. This can disrupt operation of the base station and/or cause the base station to provide erroneous information to other devices.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 1 is a diagram illustrating an example scenario for signal spoof detection at base stations.

FIG. 3 is a diagram illustrating an example scenario for signal spoof detection at base stations utilizing location information.

FIG. 5 is a diagram illustrating an example scenario for signal spoof detection at base stations utilizing power spectral density data.

FIG. 7 is a diagram illustrating an example scenario for signal spoof detection at base stations utilizing ratio of carrier power to noise power information.

DETAILED DESCRIPTION OF EXAMPLE EMBODIMENTS

Figure 2:
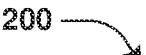
FIG. 2 is a flow chart illustrating an example method for signal spoof detection at base stations utilizing location information.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for signal spoof detection at base stations are provided. A base station may operate based upon signals received by the base station. In an example, the base station may receive communication signals from devices such as user equipment. The base station may transmit the communication signals through a communication network in order to provide the devices with communication capabilities over the communication network. In another example, the base station may receive signals from a satellite. The signals may correspond to location information (e.g., GPS location data). The base station may utilize the signals to determine a real time location of the base station. The base station may compare the real time location to a fixed known location of the base station in order to determine an error in the location information. For example, the location information may correspond to GPS location data, which may have an error margin of up to 5 meters in any direction. The base station may communicate error correcting information to nearby GPS receivers of devices (e.g., GPS receivers of phones, watches, vehicles, or other user equipment with GPS capabilities) so that the devices can adjust their own GPS location data in order to compensate for any errors in their GPS location data. In this way, the precision of location tracking by these devices is improved.

Unfortunately, malicious entities may utilize various types of devices, referred to as malicious devices, to spoof the signals transmitted to the base station with erroneous information. For example, a malicious device may be used to transmit spoofed signals to the base station. These spoofed signals may be meant to spoof satellite signals normally received from the satellite by the base station. In an example, the spoofed signals may comprise erroneous location information and/or other erroneous information. If the base station does not realize that received signals are spoofed signals, then the base station will operate based upon the erroneous location information. This can cause the base station to transmit incorrect error correcting information to other devices. This then can cause the other devices to operate incorrectly because the devices may adjust GPS location data using the incorrect error correcting information, which may result in incorrect GPS location data that the device will operate based upon.

FIG. 1 illustrates an example of a system 100 where a base station 102 may experience a spoofing attack. For example, the base station 102 may receive signals from one or more satellites, such as where the base station 102 receives signals 108 comprising GPS location data and/or other data from a first satellite 104. The base station 102 may utilize the GPS location data and/or other data to communicate information to one or more devices, such as a first device 106 (e.g., user equipment). For example, the base station 102 may generate error correcting information based upon the signals 108. The base station 102 may transmit the error correcting information to the first device 106 so that the first device 106 may verify or correct GPS location data based upon the error correcting information. It may be appreciated that the signals 108 received by the base station 102 and/or the information communicated to the first device 106 may comprise any type of information, and that GPS location data and error correcting information is merely used as one example for illustrative purposes.

A malicious device 110 may perform a spoofing attack upon the base station 102 by transmitting spoofed signals 112 that are meant to appear to be the satellite signals 108 transmitted by the first satellite 104. However, the spoofed signals 112 may comprise erroneous information, such as incorrect GPS location data. This can cause operation of the base station 102 and/or the first device 106 to operate incorrectly.

Accordingly, as provided herein, operation of the base station 102 and devices receiving information from the base station 102 is improved by detecting spoof attacks and protecting the base station 102 and the devices from the spoof attacks. Various techniques are disclosed for detecting the spoofing attack by the malicious device 110. In some embodiments, these techniques utilize known information about the base station 102 to detect the spoofing attack, such as a true position of the base station 102, expected noise experienced by the base station 102 in relation to the satellite signals 108, expected signal power and strength of the satellite signals 108 received at the base station 102, etc. In this way, information about the base station 102 may be used to detect a spoofing attack.

Once the spoofing attack is detected, various remedial actions may be performed. In some embodiments, the base station 102 may be taken offline from the communication network so that the base station does not provide erroneous information to other devices or expose information to the malicious device 110. In some embodiments, one or more base stations within a proximity threshold distance to the base station 102 may be evaluated to validate the authenticity of data associated with these base stations, such as by checking real time locations of the base stations. Devices that have been served data from the base station 102 within a threshold timespan (e.g., within the last hour) may be provided with notifications of the spoof attack (breach).

An embodiment of signal spoof detection at base stations utilizing location information is illustrated by an exemplary method 200 of FIG. 2, which is further described in conjunction with system 300 of FIG. 3. A base station 302 may provide various functionality for devices, such as for user equipment (UE). For example, the base station 302 may provide communication functionality for a first device 306 so that the first device 306 can communicate over a communication network. In another example, the base station 302 may utilize real time kinematics in order to provide error correcting information to the first device 306. In this way, the first device 306 may adjust GPS location data based upon the error correcting information in order to improve the accuracy of the first device 306 tracking location information of the first device 306.

The base station 302 may receive satellite signals from satellites, such as satellite signals 308 from a first satellite 304. The satellite signals 308 may comprise various information, such as timing information from which location information may be calculated. For example, the satellite signals may comprising carrier/global navigation satellite system (GNSS) timing data, which may be used by various types of navigation systems such as GPS. The base station 302 may be able to evaluate the satellite signals 308 received from the first satellite 304 in order to calculate a real time position of the base station 302. In some embodiments, the real time position may be calculated based upon timing information within the satellite signals 308. The GPS location data may have a particular margin of error, such as where the GPS location data may be up to 5 meters off in any direction, for example. The base station 302 may be configured with or capable of determining location information corresponding to a true position of the base station 302. In an example, the location information may be configured within the base station 302 during installation because the location of the base station 302 is known. In another example, the location information may be determined based upon a measured distance from the base station 302, having a known fixed location, to stationary infrastructure such as a distance to a cellular tower having a known fixed location.

If the difference between the true position and the real time position is within the margin of error (e.g., within 5 meters of one another), then the satellite signals 308 may be verified as being received from the first satellite 304. These signals may be determined to not be spoofed signals because the real time location data within the satellite signals 308 is within reason with what was expected. However, if the difference between the true position and the real time position exceeds the margin of error, then the real time location data within the satellite signals 308 is not what was expected. In this instance, the base station 302 may have been moved, GPS functionality of the first satellite 304 is not working correctly, or the base station 302 may be experiencing a spoof attack such as by a malicious device 310.

As provided herein, a spoofing attack upon the base station 302 may be identified based upon location information. During operation 202 of method 200, the location information of the base station 302 may be evaluated to determine the true position 314 of the base station 302. The true position 314 may correspond to a known position of the base station 302. For example, the base station 302 may be configured with the location information during install. In another example, the location information may be determined based upon a measured distance from the base station 302 to other stationary infrastructure such as a cellular tower. In some embodiments, the location information may be sampled/measured over a time period (e.g., sampled over a plurality of days) to determine the true position 314 as a proximate constant value. In some embodiments, a pattern recognition neural network 318 may be trained using the location information, such as where the pattern recognition neural network 318 is trained using measured distances from the base station 302 to other infrastructure or equipment over time. The pattern recognition neural network 318 is trained using the location information in order to recognize patterns in the location information associated with the base station 302.

During operation 204 of method 200, a received signal that is received by the base station 302 may be processed evaluated to calculate a real time position 316 of the base station 302. In some embodiments of the processing, signals received by the base station 302 may correspond to GPS/GNSS signals. These signals may be radio waves that have information encoded onto them. When the base station 302 receives these signals, the signals pass through RF hardware elements in order to convert a waveform of the signals into a digital output, such as through the use of an analog to digital converter. Next, the signals may be amplified because the signals have traveled a significant distance, and thus a signal strength/amplitude would need to be attenuated. Furthermore, the signals may have noise characteristics that would need to be removed. In an example, digital information may be extracted from GNSS signals as part of the processing. Once timing and other information is extracted from the received signal, the extracted information can be evaluated to decipher location information. In some embodiments, the real time position may be calculated based upon GNSS timing data or other timing data within the received signals 312. If the base station 302 is not under a spoof attack such that the satellite signals 308 transmitted by the first satellite 304 are not being spoofed, then the received signal 312 would be received from the first satellite 304. If the received signal 312 was received from the first satellite 304, then the true position 314 and the real time position 316 would be within a threshold distance of one another (e.g., within 5 meters). If not, then received signal 312 may be a spoofed signal transmitted by the malicious device 310 to the base station 302 to spoof the satellite signals 308 transmitted by the first satellite 304.

During operation 206 of method 200, a distance between the real time position 316 of the base station 302 and the true position 314 of the base station 302 may be calculated. In some embodiments, the distance may corresponds to a linear distance between the real time position 316 of the base station 302 and the true position 314 of the base station 302. The distance may be compared to a threshold distance to determine whether the distance exceeds the threshold distance or not. In some embodiments, the threshold distance may be derived from an error margin associated with GPS location data, such as 5 meters or any other distance.

During operation 208 of method 200, in response to the distance exceeding the threshold distance, an alert may be generated. The alert may indicate that the base station 302 is experiencing a spoofing attack, such as where the received signal 312 was generated by the malicious device 310 to spoof the satellite signals 308 expected from the first satellite 304. In some embodiments, the pattern recognition neural network 318, trained to recognize patterns in location information associated with the base station 302, may be used to perform a pattern recognition test in response to the alert being generated. Real time data collected over a timespan (e.g., real time location data collected over the past few minutes) may be input into the pattern recognition neural network 318. The pattern recognition neural network 318 may evaluate the real time data collected over the timespan to determine whether the real time position of the base station 316 has been increasingly deviating from the true position 314 over time, which would be due to the spoofing attack. This information may be used by the pattern recognition neural network 318 to determine a start time of the spoofing attack.

Various remedial actions may be performed in response to the alert being generated. In some embodiments, the base station 302 may be taken offline from the communication network or may stop accepting new connections/requests so that connected devices transition to connecting with other base stations. In this way, operation of the base station 302 is modified so that the base station 302 does not provide erroneous information to other devices or expose information to the malicious device 310. In some embodiments, one or more base stations within a proximity threshold distances to the base station 302 may be evaluated to validate the authenticity of data associated with these base stations, such as by checking real time locations of the base stations. In some embodiments, devices that have been served data from the base station 302 within a threshold timespan (e.g., within the last hour) may be provided with notifications of the spoof attack. In some embodiments, operation of the base station 302 may be modified based upon the alert. In some embodiments, the alert may be transmitted over a wireless connection to a device, such as the first device 306 or other infrastructure components.

Figure 4:
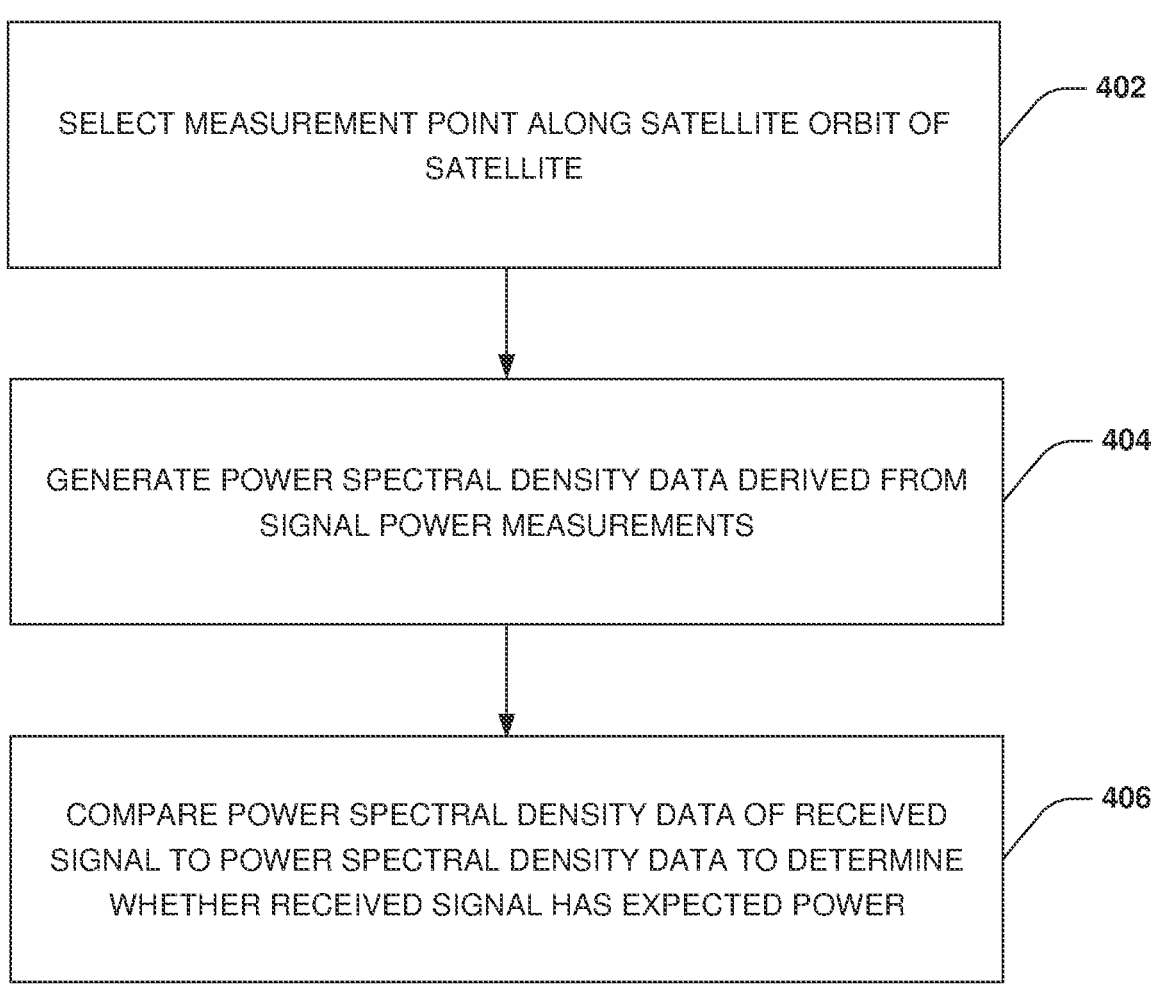
FIG. 4 is a flow chart illustrating an example method for signal spoof detection at base stations utilizing power spectral density data.

An embodiment of signal spoof detection at base stations utilizing power spectral density data is illustrated by an exemplary method 400 of FIG. 4, which is further described in conjunction with system 500 of FIG. 5. A base station 502 may provide various functionality for devices, such as user equipment (UE). For example, the base station 502 may provide communication functionality for a first device 506 so that the first device 506 can communicate over a communication network. In another example, the base station 502 may utilize real time kinematics in order to provide error correcting information to the first device 506. In this way, the first device 506 may adjust GPS location data based upon the error correcting information in order to improve the accuracy of the first device 506 tracking location information of the first device 506. The base station 502 may receive satellite signals from satellites, such as satellite signals 508 from a first satellite 504. The satellite signals 508 may comprise various information, such as timing information used to calculate a real time position.

Satellites, such as the first satellite 504, may orbit around Earth along a satellite orbit. Based upon an orientation of the base station 502, the first satellite 504 will come into "view" of the base station 502 during certain segments of the satellite orbit such that the base station 502 will be able to receive signals from the first satellite 504. The location information of the base station 502 may comprise information on the quality of raw satellite signals, such as the satellite signals 508 received from the first satellite 504. The first satellite 504 has a fixed satellite orbit and the base station 502 may be located at a fixed location on Earth. Because the satellite orbit of the first satellite 504 is known, the base station 502 can measure the signal power of the satellite signals 508 each time the first satellite 504 crosses a particular point along the satellite orbit of the first satellite 504. The signal power should ideally be constant or within a small threshold of difference between measurements. This can be used to detect spoofed signals that have signal powers deviating from the expected signal power of the satellite signals 508.

Accordingly, during operation 402 of method 400, a measurement point along the satellite orbit of the first satellite 504 and in view of the base station 502 may be selected. In some embodiments, the measurement point may correspond to a selected elevation angle. It may be appreciated that any number of measurement points, elevation angles, and/or satellites may be selected for obtaining signal power measurements. Satellite signals 508 at these measurement points and/or elevation angles may be measured across particular frequencies for each satellite. During operation 404 of method 400, power spectral density data (e.g., a power spectral density plot) is generated for each satellite based upon signal power measurements of signals received from each satellite at the measurement points and/or at the elevation angles across the frequencies. In an example, a power spectral density plot comprises in-phase power spectral density along a first axis (e.g., ranging from −260 to −220 dBW/Hz), frequency offset with respect to carriers along a second axis (e.g., ranging from −20 to 20 MHz), and P(Y) code 90 degrees out of phase with the C/A code along a third axis (e.g., −220 to −260 dBW/Hz). The signal power measurements may be collected over a plurality of days for creating the power spectral density data in order to compensate for atmospheric effects that could affect the signal power measurements at a particular given point in time (e.g., during lightening, rain, snow, etc.).

The power spectral density data 514 may be used to determine if a received signal has an expected signal power, and if not, then the received signal may be a spoofed signal. In an example, a received signal 512 may be received by the base station 502. A power spectral density 516 of the received signal 512 may be measured. During operation 406 of method 400, the power spectral density 516 of the received signal 512 may be compared to the power spectral density data 514 to determine whether the received signal 512 has an expected signal power similar to the signal power of the satellite signals 508 from the first satellite 504. If the signal power of the received signal 512 is not within a threshold of the expected signal power, then the base station 502 may be determined to be experiencing a spoofing attack, such as there the received signal 512 was transmitted by a malicious device 510.

In some embodiments of determining whether the received signal 512 is a spoofed signal, the received signal 512 such as the power spectral density 516 of the received signal 512 may be compared to a sample of the power spectral density data of a plurality of prior observations using a divergence operation (e.g., a Kullback-Leibler divergence). The divergence operation is used to determine an average divergence of the received signal 512 such as the power spectral density 516 of the received signal 512 with respect to the sample of the power spectral density data. In an example, the power spectral density 516 of the received signal 512 is compared to the sample of the power spectral density data using the divergence operation. The received signal 512 is flagged as a spoofed signal if the divergence is some degree of confidence higher than an average determined from a previous average divergence between multiple samples of the power spectral density data. An alert may be generated and/or a remedial action may be performed in response to the average divergence exceeding a threshold indicating that the received signal 512 may be a spoofed signal.

In some embodiments of determining whether the received signal 512 is a spoofed signal, one or more models 518 may be trained using the power spectral density data 514 to determine patterns that can be used for analyzing received signals on a temporal axis and/or a spatial axis. That is, the one or more models 518 may be trained to evaluate received signals on the temporal axis and/or the spatial axis in order to compare power spectral density of the received signals to power spectral density data of a plurality of prior observations. This is done in order to determine whether the base station 502 is experiencing a spoofing attack. The temporal axis may be used to analyze the received signal 512 utilizing a recurrent neural network, a long short-term memory (LSTM) model, a gate recurrent units (GRU) model, or other type of model of the one or more models 518. The spatial axis may be used to analyze the received signal 512 utilizing a one-dimensional convolutional neural network, an auto encoder based anomaly detection model, or other type of model of the one or more models 518. An alert may be generated and/or a remedial action may be performed in response to the one or more models 518 determining that the received signal 512 deviates by a threshold amount on at least the one of the temporal axis or the spatial axis.

Various remedial actions may be performed in response to the alert being generated. In some embodiments, the base station 502 may be taken offline from the communication network so that the base station 502 does not provide erroneous information to other devices or expose information to the malicious device 510. In some embodiments, one or more base stations within a proximity threshold distances to the base station 502 may be evaluated to validate the authenticity of data associated with these base stations, such as by checking real time locations of the base stations. In some embodiments, devices that have been served data from the base station 502 within a threshold timespan (e.g., within the last hour) may be provided with notifications of the spoof attack. In some embodiments, operation of the base station 502 may be modified based upon the alert. In some embodiments, the alert may be transmitted over a wireless connection to a device, such as the first device 506 or other infrastructure components.

Figure 6:
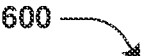
FIG. 6 is a flow chart illustrating an example method for signal spoof detection at base stations utilizing ratio of carrier power to noise power information.
Figure 6:
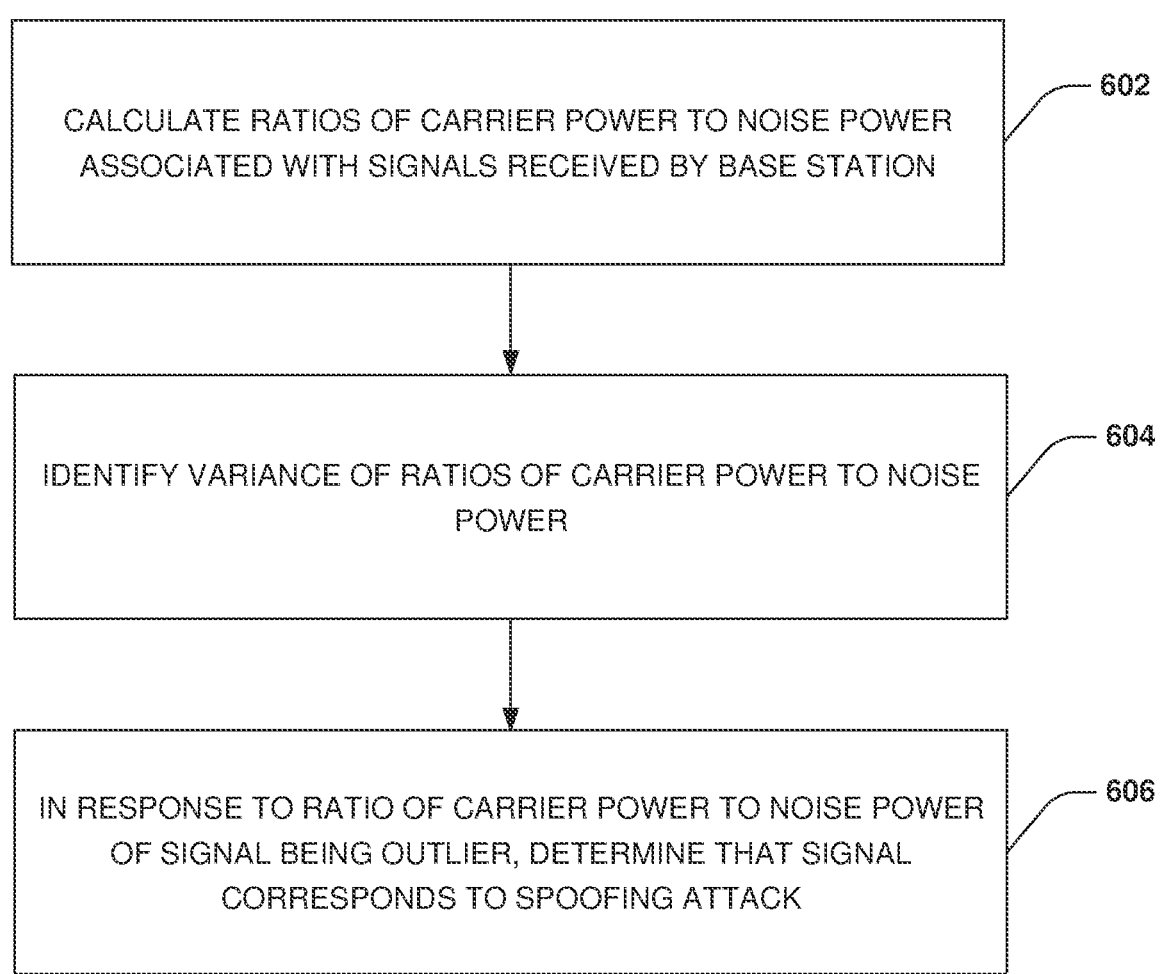

An embodiment of signal spoof detection at base stations utilizing ratio of carrier power to noise power information is illustrated by an exemplary method 600 of FIG. 6, which is further described in conjunction with system 700 of FIG. 7. A base station 702 may provide various functionality for devices, such as user equipment (UE). For example, the base station 702 may provide communication functionality for a first device 706 so that the first device 706 can communicate over a communication network. In another example, the base station 702 may utilize real time kinematics in order to provide error correcting information to the first device 706 so that the first device 706 may adjust GPS location data based upon the error correcting information in order to improve the accuracy of the first device 706 tracking location information of the first device 706. For example, the base station 702 may utilize the real time kinematics to provide error correcting information to other devices. In an example, the real time kinematics correspond to measurements of signals received by the base station 702 from a GNSS system, which are evaluated to identify errors with the GNSS system. These other devices can use the error correcting information to correct global positioning system (GPS) location data that may otherwise be subject to a particular margin of error such as 5 meters. In this way, the devices may utilize the error correcting information to correct their GPS location data. This error correcting information may be derived from a known fixed location of the base station 702 and a real time location derived from signals received from a satellite. The base station 702 may receive satellite signals from satellites, such as satellite signals 708 from a first satellite 704. The satellite signals 708 may comprise various information, such as timing information used to calculate a real time position.

Deviations in radio noise may be used to determine whether received signals are spoofed signals or not. In an example, a ratio of carrier power to noise power is mixed with satellite signals in a 1 Hz bandwidth. A noise characteristic may be derived from data provided by a receiver manufacturer of a receiver component of the base station 702. In an example, this noise characteristic may be a constant value. Thus, a carrier power to noise power ratio depends on a carrier/global navigation satellite system (GNSS) signal power that the receiver sees at an antenna of the base station 702, for example. This information may be used to determine whether received signals are spoofed signals or not.

During operation 602 of method 600, ratios of carrier power to noise power 714 associated with the signals received by the base station 702 from one or more satellites in a constellation, such as the satellite signals 708 received from the first satellite 704, may be determined. During operation 604 of method 600, a variance of the ratios of carrier power to noise power 714 of the one or more satellites in the constellation may be determined. In response to the base station 702 receiving a received signal 712, a ratio of carrier power to noise power 716 of the received signal 712 may be determined. The ratio of carrier power to noise power 716 of the received signal 712 may be compared with the variance of the ratios of carrier power to noise power 714 of the one or more satellites in the constellation to determine whether the ratio of carrier power to noise power 716 of the received signal 712 is an outlier.

During operation 606 of method 600, a determination may be made that a transmit power of the received signal 712 has been tampered with and that the received signal 712 corresponds to a spoof attack. This determination may be made based upon the ratio of carrier power to noise power 716 of the received signal 712 being an outlier. The ratio of carrier power to noise power 716 of the received signal 712 may be determined as being the outlier based upon the comparison of the ratio of carrier power to noise power 716 to the variance. An alert may be generated and/or a remedial action may be performed in response determining that the base station 702 is experiencing the spoof attack, such as where the malicious device 710 is using the received signal 712 to spoof the satellite signals 708 of the first satellite 704.

In some embodiments, correlation coefficients 718 may be calculated for each satellite of the one or more satellites in the constellation. The correlation coefficients 718 may be calculated amongst ratios of carrier power to noise power for sets of satellites. In an example, Pearson correlation coefficients are calculated between ratios of carrier power to noise power for two sets of satellites while iterating through all satellites in the constellation. That is, correlation coefficients for satellites pairs may be averaged to create averaged correlation coefficients for the satellites pairs for determining whether received signals are spoofed signals. This may be repeated over a period of time (e.g., days or months). In this way, average correlation coefficients may be obtained for pairs of satellites, which may be used for detecting spoofed signals.

When the base station 702 receives the received signal 712, a correlation coefficient of the received signal 712 may be determined. In response to the correlation coefficient diverging from the averaged correlation coefficients by a threshold amount, a determination may be made that the received signal 712 is a spoofed signal. That is, the ratio of carrier power to noise power 716 and the correlation coefficient of the received signal 712 may be calculated with respect to corresponding satellite pairs in order to determine the divergence. If the divergence of the correlation coefficient of the received signal 712 exceeds a threshold value, then the received signal 712 is determined to be a spoofed signal.

Various remedial actions may be performed in response to the alert being generated. In some embodiments, the base station 702 may be taken offline from the communication network so that the base station 702 does not provide erroneous information to other devices or expose information to the malicious device 710. In some embodiments, one or more base stations within a proximity threshold distances to the base station 702 may be evaluated to validate the authenticity of data associated with these base stations, such as by checking real time locations of the base stations. In some embodiments, devices that have been served data from the base station 702 within a threshold timespan (e.g., within the last hour) may be provided with notifications of the spoof attack. In some embodiments, operation of the base station

702 may be modified based upon the alert. In some embodiments, the alert may be transmitted over a wireless connection to a device, such as the first device 706 or other infrastructure components.

According to some embodiments, a method is provided. The method includes evaluating location information of a base station to determine a true position of the base station; evaluating signals received by the base station to calculate a real time position of the base station; calculating a distance between the real time position and the true position; and in response to the distance exceeding a threshold distance, generating an alert that the base station is experiencing a spoofing attack.

According to some embodiments, the method includes sampling the location information over a time period to determine the true position as a proximate constant value.

According to some embodiments, the method includes training a pattern recognition neural network using the location information to recognize patterns in the location information associated with the base station.

According to some embodiments, the method includes in response to the alert being generated, inputting real time data associated with at least one of the location information or the signals collected over a timespan into the pattern recognition neural network to determine if the real time position has been increasingly deviating from the true position over time.

According to some embodiments, the method includes utilizing the pattern recognition neural network to determine a start time of the spoofing attack.

According to some embodiments, the method includes modifying operation of the base station in response to the alert being generated.

According to some embodiments, the method includes transmitting the alert over a wireless connection to a device.

According to some embodiments, a system is provided. The system comprises a processor coupled to memory, the processor configured to execute instructions to perform operations. The operations includes selecting a measurement point along a satellite orbit of a satellite in view of a base station; generating power spectral density data derived from signal power measurements of signals received from the satellite at the measurement point; and evaluating a received signal using the power spectral density data to determine whether the base station is experiencing a spoofing attack.

According to some embodiments, the operations include generating the power spectral density data based upon signal power measurements of signals received from the satellite at a plurality of measurement points.

According to some embodiments, the operations include generating the power spectral density data based upon signal power measurements of signals received from the satellite at a plurality of elevation angles.

According to some embodiments, the signals are received over a plurality of days, and wherein atmospheric effects are compensated for based upon the signal power measurements of the signals received over the plurality of days.

According to some embodiments, the operations include collecting the signals across one or more frequencies.

According to some embodiments, the operations include comparing the received signal to a sample of power spectral density data of a plurality of prior observations using a divergence operation to determine an average divergence of the received signal from the sample of power spectral density data; and generating an alert that the base station is experiencing the spoofing attack based upon the average divergence exceeding a threshold.

According to some embodiments, the operations include training one or more models, using the power spectral density data, for evaluating received signals on a temporal axis and a spatial axis to compare power spectral density of the received signals to power spectral density data of a plurality of prior observations in order to determine whether the base station is experiencing the spoofing attack; and generating an alert that the base station is experiencing the spoofing attack based upon the one or more models determining that the received signals deviate by a threshold amount on at least one of the temporal axis or the spatial axis.

According to some embodiments, the operations include in response to determining that the base station is experiencing the spoofing attack, modifying operation of the base station to block signals determined to be spoofing signals.

According to some embodiments, a non-transitory computer-readable medium storing instructions that when executed facilitate performance of operations, is provided. The operations include calculating ratios of carrier power to noise power associated with signals received by a base station from one or more satellites in a constellation; identifying a variance of the ratios of carrier power to noise power; and in response to determining that a ratio of carrier power to noise power of a signal is an outlier based upon a comparison of the ratio of carrier power to noise power to the variance, determining that a transmit power of the signal has been tampered with and that the signal corresponds to a spoofing attack of the base station.

According to some embodiments, the operations include for each satellite of the one or more satellites, calculating a correlation coefficient between ratios of carrier power to noise power for sets of satellites; and averaging the correlation coefficients for satellite pairs to create averaged correlation coefficients of the satellite pairs for determining whether a received signal is a spoofed signal.

According to some embodiments, the operations include calculating a correlation coefficient of the received signal based upon a ratio of carrier power to noise power of the signal; and in response to the correlation coefficient diverging from the averaged correlation coefficients by a threshold amount, determining that the received signal is the spoofed signal.

According to some embodiments, the operations include in response to determining that the base station is experiencing the spoofing attack, modifying operation of the base station to block signals determined to be spoofing signals.

According to some embodiments, the operations include in response to determining that the base station is experiencing the spoofing attack, transmitting an alert to user equipment in communication with the base station, wherein the alert provides an indication that the user equipment could be being spoofed.

Figure 8:
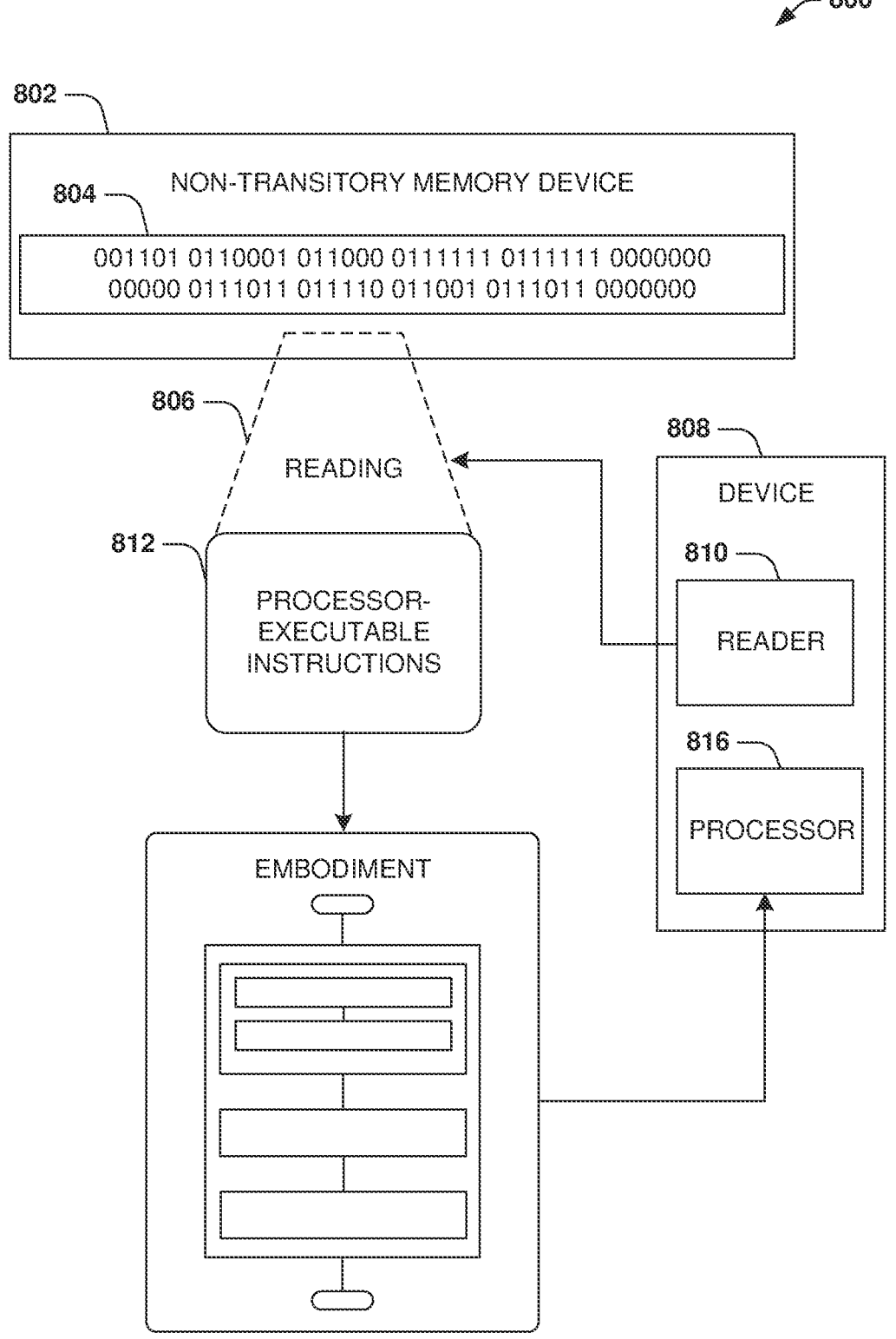
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein. The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed cause performance of operations, such as at least some of the example method 200 of FIG. 2, at least some of the example method 400 of FIG. 4, and/or at least some of the example method 600 of FIG. 6, for example. In some embodiments, the processor-executable instructions 812 are configured to cause implementation of a system, such as at least some of the example system 100 of FIG. 1, at least some of the example system 300 of FIG. 3, at least some of the example system 500 of FIG. 5, and/or at least some of the example system 700 of FIG. 7, for example.

Figure 9:
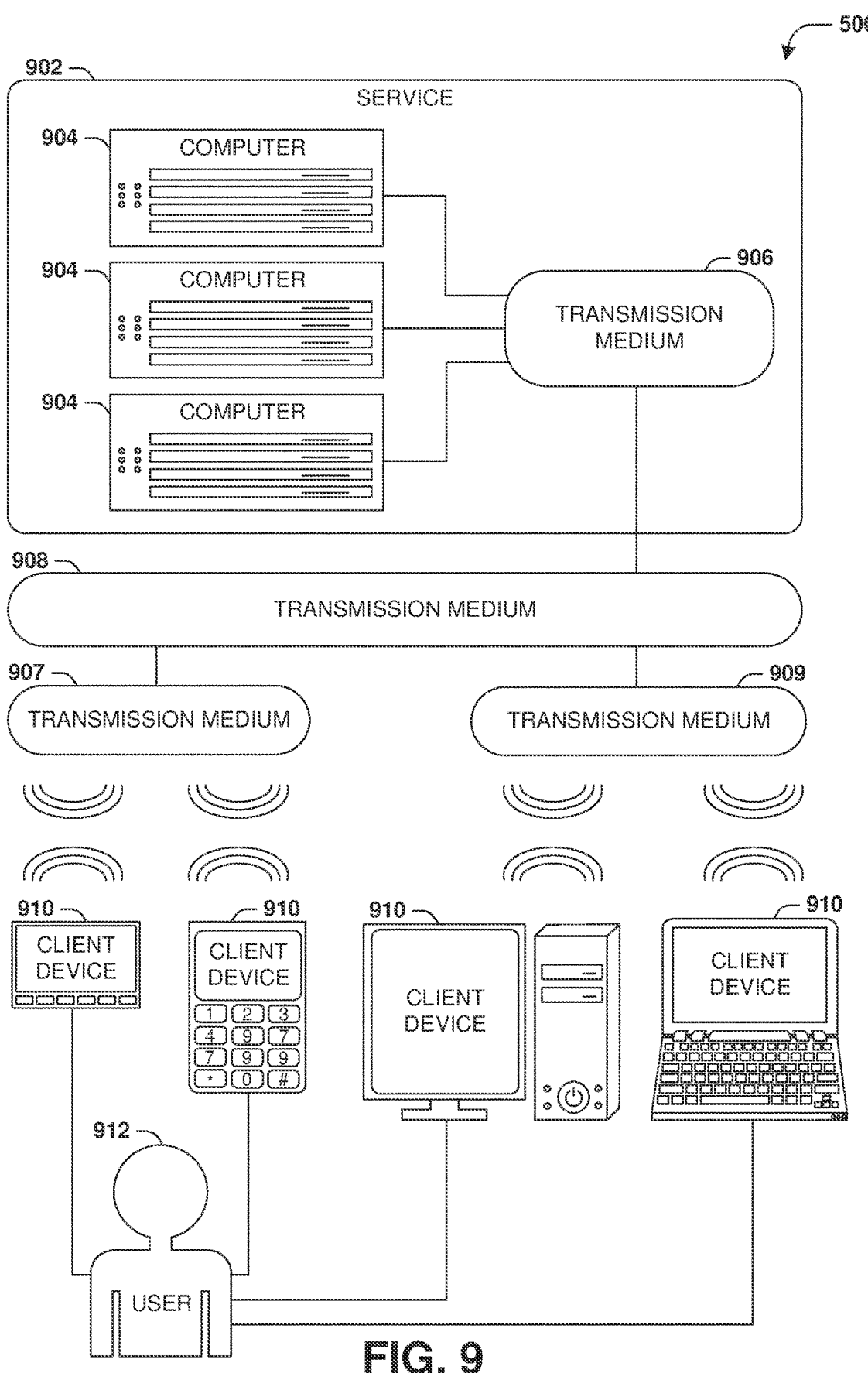
FIG. 9 is an illustration of example networks that may utilize and/or implement at least a portion of the techniques presented herein.

FIG. 9 is an interaction diagram of a scenario 900 illustrating a service 902 provided by a set of computers 904 to a set of client devices 910 via various types of transmission mediums. The computers 904 and/or client devices 910 may be capable of transmitting, receiving, processing, and/or storing many types of signals, such as in memory as physical memory states.

The computers 904 of the service 902 may be communicatively coupled together, such as for exchange of communications using a transmission medium 906. The transmission medium 906 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 902.

Likewise, the transmission medium 906 may comprise one or more sub-networks, such as may employ different architectures, may be compliant or compatible with differing protocols and/or may interoperate within the transmission medium 906. Additionally, various types of transmission medium 906 may be interconnected (e.g., a router may provide a link between otherwise separate and independent transmission medium 906).

In scenario 900 of FIG. 9, the transmission medium 906 of the service 902 is connected to a transmission medium 908 that allows the service 902 to exchange data with other services 902 and/or client devices 910. The transmission medium 908 may encompass various combinations of devices with varying levels of distribution and exposure, such as a public wide-area network and/or a private network (e.g., a virtual private network (VPN) of a distributed enterprise).

In the scenario 900 of FIG. 9, the service 902 may be accessed via the transmission medium 908 by a user 912 of one or more client devices 910, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 910 may communicate with the service 902 via various communicative couplings to the transmission medium 908. As a first such example, one or more client devices 910 may comprise a cellular communicator and may communicate with the service 902 by connecting to the transmission medium 908 via a transmission medium 907 provided by a cellular provider. As a second such example, one or more client devices 910 may communicate with the service 902 by connecting to the transmission medium 908 via a transmission medium 909 provided by a location such as the user's home or workplace (e.g., a WiFi (Institute of Electrical and Electronics Engineers (IEEE) Standard 902.11) network or a Bluetooth (IEEE Standard 902.15.1) personal area network). In this manner, the computers 904 and the client devices 910 may communicate over various types of transmission mediums.

Figures 10, 11:
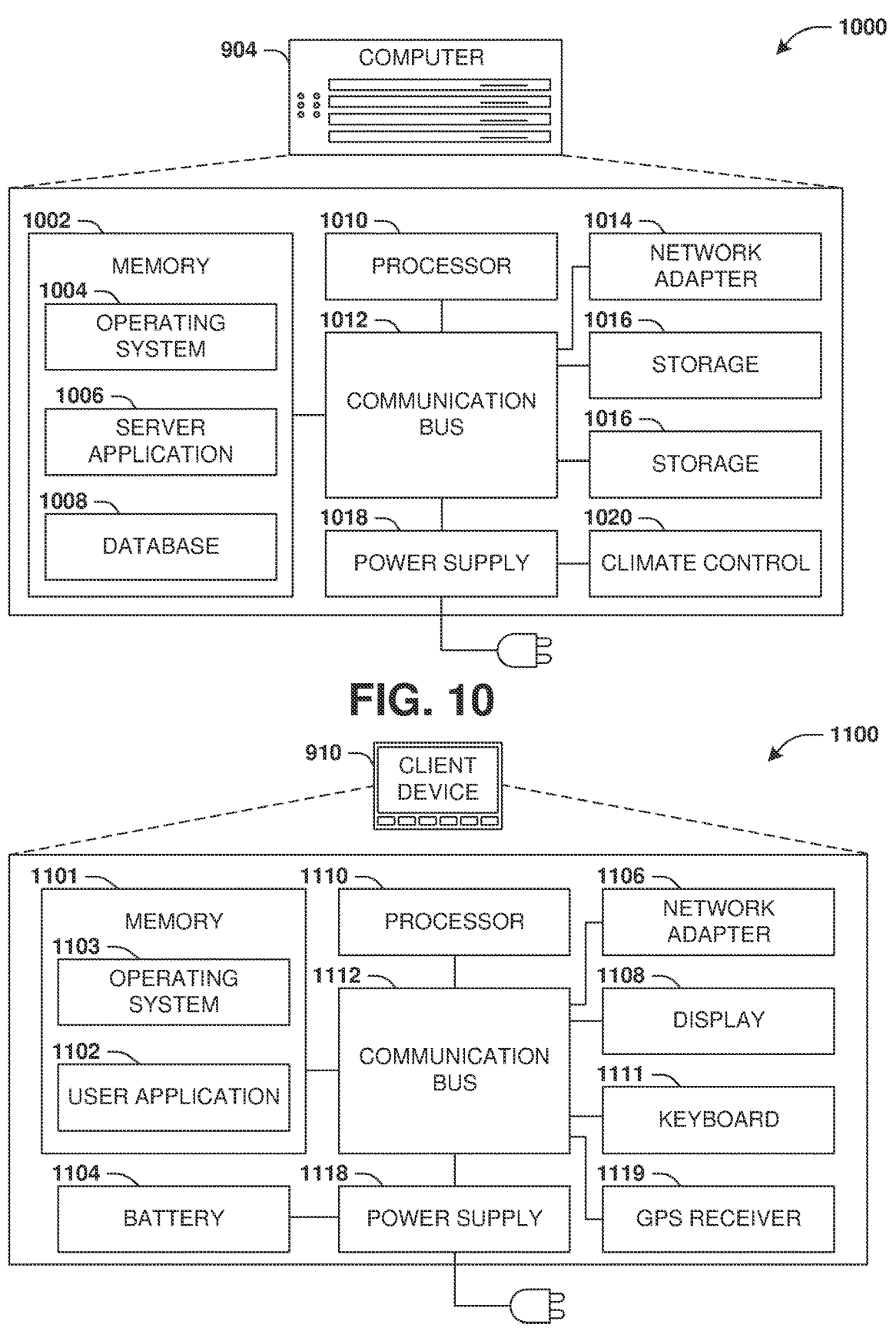
FIG. 10 is an illustration of a scenario involving an example configuration of a computer that may utilize and/or implement at least a portion of the techniques presented herein.
FIG. 11 is an illustration of a scenario involving an example configuration of a client that may utilize and/or implement at least a portion of the techniques presented herein.

FIG. 10 presents a schematic architecture diagram 1000 of a computer 904 that may utilize at least a portion of the techniques provided herein. Such a computer 904 may vary widely in configuration or capabilities, alone or in conjunction with other computers, in order to provide a service such as the service 902.

The computer 904 may comprise one or more processors 1010 that process instructions. The one or more processors 1010 may optionally include a plurality of cores; one or more coprocessors, such as a mathematics coprocessor or an integrated graphical processing unit (GPU); and/or one or more layers of local cache memory. The computer 904 may comprise memory 1002 storing various forms of applications, such as an operating system 1004; one or more computer applications 1006; and/or various forms of data, such as a database 1008 or a file system. The computer 904 may comprise a variety of peripheral components, such as a wired and/or wireless network adapter 1014 connectible to a local area network and/or wide area network; one or more storage components 1016, such as a hard disk drive, a solid-state storage device (SSD), a flash memory device, and/or a magnetic and/or optical disk reader.

The computer 904 may comprise a mainboard featuring one or more communication buses 1012 that interconnect the processor 1010, the memory 1002, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 1012 may interconnect the computer 904 with at least one other computer. Other components that may optionally be included with the computer 904 (though not shown in the schematic architecture diagram 1000 of FIG. 10) include a display; a display adapter, such as a graphical processing unit (GPU); input peripherals, such as a keyboard and/or mouse; and a flash memory device that may store a basic input/output system (BIOS) routine that facilitates booting the computer 904 to a state of readiness.

The computer 904 may operate in various physical enclosures, such as a desktop or tower, and/or may be integrated with a display as an "all-in-one" device. The computer 904 may be mounted horizontally and/or in a cabinet or rack, and/or may simply comprise an interconnected set of components. The computer 904 may comprise a dedicated and/or shared power supply 1018 that supplies and/or regulates power for the other components. The computer 904 may provide power to and/or receive power from another computer and/or other devices. The computer 904 may comprise a shared and/or dedicated climate control unit 1020 that regulates climate properties, such as temperature, humidity, and/or airflow. Many such computers 904 may be configured and/or adapted to utilize at least a portion of the techniques presented herein.

FIG. 11 presents a schematic architecture diagram 1100 of a client device 910 whereupon at least a portion of the techniques presented herein may be implemented. Such a client device 910 may vary widely in configuration or capabilities, in order to provide a variety of functionality to a user such as the user 912. The client device 910 may be provided in a variety of form factors, such as a desktop or tower workstation; an "all-in-one" device integrated with a display 1108; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 910 may serve the user in a variety of roles, such as a workstation, kiosk, media player, gaming device, and/or appliance.

The client device 910 may comprise one or more processors 1110 that process instructions. The one or more processors 1110 may optionally include a plurality of cores; one or more coprocessors, such as a mathematics coprocessor or an integrated graphical processing unit (GPU); and/or one or more layers of local cache memory. The client device 910 may comprise memory 1101 storing various forms of applications, such as an operating system 1103; one or more user applications 1102, such as document applications, media applications, file and/or data access applications, communication applications such as web browsers and/or email clients, utilities, and/or games; and/or drivers for various peripherals. The client device 910 may comprise a variety of peripheral components, such as a wired and/or wireless network adapter 1106 connectible to a local area network and/or wide area network; one or more output components, such as a display 1108 coupled with a display adapter (optionally including a graphical processing unit (GPU)), a sound adapter coupled with a speaker, and/or a printer; input devices for receiving input from the user, such as a keyboard 1111, a mouse, a microphone, a camera, and/or a touch-sensitive component of the display 1108; and/or environmental sensors, such as a global positioning system (GPS) receiver 1119 that detects the location, velocity, and/or acceleration of the client device 910, a compass, accelerometer, and/or gyroscope that detects a physical orientation of the client device 910. Other components that may optionally be included with the client device 910 (though not shown in the schematic architecture diagram 1100 of FIG. 11) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 910 to a state of readiness; and a climate control unit that regulates climate properties, such as temperature, humidity, and airflow.

The client device 910 may comprise a mainboard featuring one or more communication buses 1112 that interconnect the processor 1110, the memory 1101, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 910 may comprise a dedicated and/or shared power supply 1118 that supplies and/or regulates power for other components, and/or a battery 1104 that stores power for use while the client device 910 is not connected to a power source via the power supply 1118. The client device 910 may provide power to and/or receive power from other client devices.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In some embodiments, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
sampling location information of a base station over a time period to determine a true position of the base station as a proximate constant value;
processing and evaluating signals received by the base station to calculate a real time position of the base station, wherein the signals received by the base station are different than the location information of the base station;
calculating a distance between the real time position of the base station and the true position of the base station;
in response to the distance exceeding a threshold distance, generating an alert that the base station is experiencing a spoofing attack;
in response to the alert being generated, inputting real time data associated with at least one of the location information or the signals collected over a timespan into a pattern recognition neural network, training the pattern recognition neural network using the location information to recognize patterns in the location information associated with the base station, and using the pattern recognition neural network to determine whether the real time position has been increasingly deviating from the true position over time in association with a spoofing attack; and
performing, via a processor, one or more remedial actions based upon the alert.

2. The method of claim 1, wherein the one or more remedial actions comprise at least one of:
taking the base station offline from a communication network; or
configuring the base station to stop accepting new connections.

3. The method of claim 1, comprising:
utilizing the pattern recognition neural network to determine a start time of the spoofing attack.

4. The method of claim 1, comprising:
modifying operation of the base station in response to the alert being generated.

5. The method of claim 1, comprising:
transmitting the alert over a wireless connection to a device.

6. The method of claim 1, wherein the one or more remedial actions comprise:

evaluating an authenticity of data associated with one or more base stations within a proximity threshold distance to the base station.

7. The method of claim 1, wherein the one or more remedial actions comprise:

sending a notification of the spoofing attack to one or more devices that have been served data from the base station within a threshold timespan.

8. A system comprising:

a memory comprising instructions; and a processor coupled to the memory, the processor configured to execute the instructions to facilitate performance of operations comprising:

selecting a measurement point along a satellite orbit of a satellite in view of a base station;

generating power spectral density data based upon signal power measurements of signals received by the base station from the satellite at the measurement point;

training one or more models, using the power spectral density data, for evaluating received signals to compare power spectral density of the received signals to power spectral density data of a plurality of prior observations;

evaluating, using the one or more models, a received signal received by the base station in comparison to at least some of the power spectral density data of the plurality of prior observations to determine an average divergence of the received signal from the at least some of the power spectral density data, and determining whether the base station is experiencing a spoofing attack based upon the average divergence;

generating an alert that the base station is experiencing the spoofing attack based upon the average divergence exceeding a threshold; and performing one or more remedial actions based upon the determination of whether the base station is experiencing a spoofing attack.

9. The system of claim 8, the operations comprising:

generating the power spectral density data based upon signal power measurements of signals received from the satellite at a plurality of measurement points.

10. The system of claim 8, the operations comprising:

generating the power spectral density data based upon signal power measurements of signals received from the satellite at a plurality of elevation angles.

11. The system of claim 8, wherein the signals are received over a plurality of days, and wherein atmospheric effects are compensated for based upon the signal power measurements of the signals received over the plurality of days.

12. The system of claim 8, wherein the operations comprise:

collecting the signals across one or more frequencies.

13. The system of claim 8, wherein the operations comprise:

in response to determining that the base station is experiencing the spoofing attack, modifying operation of the base station to block signals determined to be spoofing signals.

14. The system of claim 8, wherein the one or more remedial actions comprise:

taking the base station offline from a communication network.

15. The system of claim 8, wherein the one or more remedial actions comprise:

configuring the base station to stop accepting new connections.

16. A non-transitory computer-readable medium storing instructions that when executed facilitate performance of operations comprising:

calculating ratios of carrier power to noise power associated with signals received by a base station from one or more satellites in a constellation;

identifying a variance of the ratios of carrier power to noise power associated with the base station;

in response to determining that a ratio of carrier power to noise power of a signal received by the base station is an outlier based upon a comparison of the ratio of carrier power to noise power to the variance associated with the base station, determining that a transmit power of the signal has been tampered with and that the signal corresponds to a spoofing attack of the base station;

performing, via a processor, one or more remedial actions based upon the determination that the signal corresponds to a spoofing attack of the base station;

for each satellite of the one or more satellites, calculating a correlation coefficient between ratios of carrier power to noise power for sets of satellites;

averaging the correlation coefficients for satellite pairs to create averaged correlation coefficients of the satellite pairs for determining whether a received signal is a spoofed signal;

calculating a correlation coefficient of the received signal based upon a ratio of carrier power to noise power of the signal; and in response to the correlation coefficient diverging from the averaged correlation coefficients by a threshold amount, determining that the received signal is the spoofed signal.

17. The non-transitory computer-readable medium of claim 16, the operations comprising:

in response to determining that the base station is experiencing the spoofing attack, modifying operation of the base station to block signals determined to be spoofing signals.

18. The non-transitory computer-readable medium of claim 16, the operations comprising:

in response to determining that the base station is experiencing the spoofing attack, transmitting an alert to user equipment in communication with the base station, wherein the alert provides an indication that the user equipment could be being spoofed.

19. The non-transitory computer-readable medium of claim 16, wherein the one or more remedial actions comprise:

taking the base station offline from a communication network.

20. The non-transitory computer-readable medium of claim 16, wherein the one or more remedial actions comprise:

configuring the base station to stop accepting new connections.

\* \* \* \* \*